United States Patent
Lindqvist et al.

(10) Patent No.: US 12,312,542 B2
(45) Date of Patent: May 27, 2025

(54) METHOD FOR REDUCING DEACTIVATION OF A HYDROTREATMENT CATALYST

(71) Applicant: Neste Oyj, Espoo (FI)

(72) Inventors: Petri Lindqvist, Porvoo (FI); Väinö Sippola, Porvoo (FI); Pekka Aalto, Porvoo (FI); Meri Hovi, Porvoo (FI); Ville Suntio, Porvoo (FI); José Luis González Escobedo, Porvoo (FI)

(73) Assignee: NESTE OYJ, Espoo (FI)

( * ) Notice: Subject to any disclaimer, the term of this patent is extended or adjusted under 35 U.S.C. 154(b) by 264 days.

(21) Appl. No.: 18/297,183

(22) Filed: Apr. 7, 2023

(65) Prior Publication Data

US 2023/0323215 A1     Oct. 12, 2023

(30) Foreign Application Priority Data

Apr. 7, 2022    (FI) .................................... 20225302

(51) Int. Cl.
*C10G 3/00*    (2006.01)
*B01J 21/04*    (2006.01)
(Continued)

(52) U.S. Cl.
CPC ............... *C10G 3/50* (2013.01); *B01J 21/04* (2013.01); *B01J 23/883* (2013.01); *C10G 45/58* (2013.01);
(Continued)

(58) Field of Classification Search
None
See application file for complete search history.

(56) References Cited

U.S. PATENT DOCUMENTS 3,895,042 A    8/1975  Taylor
3,985,042 A    10/1976 Cornu
(Continued)

FOREIGN PATENT DOCUMENTS

EP    0 574 272       12/1993
EP    2155838 B1      2/2010
(Continued)

OTHER PUBLICATIONS

D. Kubicka et al., "Ultraclean Fuels Obtained by Hydrodeoxygenation of Renewable Feedstocks: Deactivation of Deoxygenation Catalysts", Preprints of Symposia—American Chemistry Society, Divisional of Fuel Chemistry, vol. 55, No. 1, 2010, pp. 169-170, XP09544843, the whole document.
(Continued)

*Primary Examiner* — Tam M Nguyen
(74) *Attorney, Agent, or Firm* — Joshua B. Brady; Nixon & Vanderhye, P.C.

(57) ABSTRACT

The present invention relates to a method for reducing deactivation of a hydrotreatment catalyst. The hydrotreatment catalyst is used as a main active catalyst for producing renewable hydrocarbons by hydrotreatment from a renewable feedstock which comprises at least an oxygen containing compound, at least one metal containing compound and at least one phosphorus containing compound as impurities. The method comprising adjusting the metal to phosphorus (M:P) weight ratio of the renewable feedstock to a value within the range from 0.70 to 1.26, measured as elemental metal and elemental phosphorus, subjecting the obtained feedstock to a temperature of from 190 to 400° C. under reducing conditions, thereby forming a solid precipitate comprising at least one metal and phosphorus containing compound, and contacting the obtained liquid renewable
(Continued)

feedstock with the main active catalyst, in the presence of hydrogen.

31 Claims, 3 Drawing Sheets

(51) Int. Cl.
   *B01J 23/883* (2006.01)
   *C10G 45/58* (2006.01)
   *C10G 45/72* (2006.01)
(52) U.S. Cl.
   CPC ............... *C10G 2300/1007* (2013.01); *C10G 2300/1018* (2013.01); *C10G 2300/202* (2013.01); *C10G 2300/205* (2013.01); *C10G 2300/4006* (2013.01)

(56) References Cited

U.S. PATENT DOCUMENTS

| | | | |
|---|---|---|---|
| 4,280,962 | A | 7/1981 | Watanabe et al. |
| 8,624,070 | B2 | 1/2014 | Oldenburg et al. |
| 9,404,217 | B2 | 8/2016 | Powell et al. |
| 10,501,693 | B2 | 12/2019 | Laakkonen et al. |
| 10,947,478 | B2 | 3/2021 | Björklöf |
| 11,053,452 | B2 | 7/2021 | Gutierrez et al. |
| 11,118,133 | B2 | 9/2021 | Slade et al. |
| 2009/0000985 | A1 | 1/2009 | Van Wees et al. |
| 2009/0266743 | A1 | 10/2009 | Yao et al. |
| 2011/0138680 | A1 | 6/2011 | Dandeu et al. |
| 2016/0257888 | A1 | 9/2016 | Nousiainen et al. |
| 2019/0195758 | A1 | 6/2019 | Alden et al. |
| 2020/0040278 | A1 | 2/2020 | Malm et al. |
| 2020/0190427 | A1 | 6/2020 | Guiterrez et al. |
| 2020/0224121 | A1 | 7/2020 | Long et al. |
| 2020/0339911 | A1 | 10/2020 | Pasanen et al. |
| 2022/0251293 | A1* | 8/2022 | Huang ................ C08G 63/681 |
| 2023/0294081 | A1* | 9/2023 | Girard .................... C10G 47/12 502/337 |

FOREIGN PATENT DOCUMENTS

| | | |
|---|---|---|
| EP | 2489720 | 8/2012 |
| EP | 2 578 673 | 4/2013 |
| EP | 3 666 865 A1 | 6/2020 |
| FI | 100248 | 10/1997 |
| FI | 126029 | 5/2016 |
| GB | 2 580 221 A | 7/2020 |
| WO | WO2004094039 A2 | 11/2004 |
| WO | 1 741 768 A1 | 1/2007 |
| WO | WO2007068795 A1 | 6/2007 |
| WO | 2009/158268 | 12/2009 |
| WO | WO2013140058 | 9/2013 |
| WO | WO2016062868 A1 | 4/2016 |
| WO | WO 2018/024728 | 2/2018 |
| WO | WO 2018060324 | 4/2018 |
| WO | 2020/016410 | 1/2020 |
| WO | WO 2020/016400 A1 | 1/2020 |
| WO | WO 2020/016415 A1 | 1/2020 |
| WO | WO 2020/136034 A1 | 7/2020 |
| WO | WO2022008508 | 1/2022 |

OTHER PUBLICATIONS

Wu Shin-Kuan et al.: "Atmospheric Hydrodeoxygenation of Guaiacol over Nichel Phosphide Catalysts: Effect of Phosphorus Composition", Catalysis Letters, J.C. Baltzer, new York, vol. 144, No. 5, Mar. 18, 2014 (Mar. 18, 2014), pp. 878-889, XP035903563, ISSN: 1011-372X, DOI: 10.1007/S10562-014-1231-7 [retrieved on Mar. 18, 2014] abstract.
Abdus Salam Muhammad et al., "Influence of Bio-Oil Phospholipid on the Hydrodeoxygenation Activity of NiMoS/A1203 Catalyst", Catalysts, vol. 8, No. 10, Oct. 25, 2018 (Oct. 25, 2018), p. 418, XP093054435, CH ISSN: 2073-4344, DOI: 10.3390/catal8100418 the whole document.
Kubicka et al: Deactivation of HDS catalysts in deoxygenation of vegetable oils, Applied Catalysis A: General, 394(2011):9-17.
Martiskainen: Investigating the effects of process conditions on the capturing capacity of guard materials, Master's Thesis, Aalto University 2020.
Alvarez-Galvan et al.: Transition metal phosphides for the catalytic hydrodeoxygenation of waste oils into greed diesel, Catalysts 2019, 9, 293, pp. 1-27.
Dijs et al: Quantitative determination by 14C analysis of the biological component in fuels, Radiocarbon vol. 48 Nr 3, 2006, 315-323.
Fatty acids technology, Gianazza, pp. 1-28.
Riazi, M.R. et al. (editors), Petroleum Refining and Natural Gas Processing, 2013, ISBN 978-0-8031-7022-3 p. 230-231.
Search Report for FI Application No. 20225302 dated Aug. 22, 2022, 1 page.
Search Reoort for FI Application No. 20225301 dated Aug. 23, 2022, 2 pages.
Search Reoort for FI Application No. 20225300 dated Sep. 7, 2022, 2 pages.
International Search Reoort for PCT/FI2023/050189, mailed Jun. 23, 2023, 4 pages.
Written Ooinion of the ISA for PCT/FI2023/050189, mailed Jun. 23, 2023, 4 pages.
International Search Report for PCT/FI2023/050187 dated Jun. 29, 2023, 4 pages.
Written Ooinion of the ISA for PCT/FI2023/050187 dated Jun. 29, 2023, 6 pages.
International Search Reoort for PCT/FI2023/050188 dated Jun. 30, 2023, 4 pages.
Written Opinion of the ISA for PCT/FI2023/050188 dated Jun. 30, 2023, 6 pages.
Opposition for Application No. FI 130744B1 issued Nov. 26, 2024.
Opposition for Application No. FI 130743 issued Nov. 25, 2024.
Opposition for Application No. FI 130506 issued Jul. 3, 2024.
Bovornseripatai et al: Effect of biomass feedstocks on the production of hydrogenated biodiesel., 2012, International Journal of Chemical and Molecular Engineering, 6(4), pp. 265-269.
Arora:Deactivation of Catalysts and Reaction Kinetics for Upgrading of Renewable Oils., 2019, Chalmers Tekniska Hogskola (Sweden).
Kubicka et al: Hydrotreating of triglyceride-based feedstocks in refineries., 2013, In Advances in Chemical Engineering , vol. 42, pp. 141-194.

* cited by examiner

METHOD FOR REDUCING DEACTIVATION OF A HYDROTREATMENT CATALYST

CROSS-REFERENCE TO RELATED APPLICATIONS

This application claims priority to FI patent application No. 20225302 filed Apr. 7, 2022, the entire contents of which are hereby incorporated by reference.

TECHNICAL FIELD

The present invention relates to a method for producing renewable hydrocarbons from a renewable feedstock. In particular, the method is directed to reducing deactivation of catalyst(s) used in processing of the renewable hydrocarbons by hydrotreatment.

BACKGROUND ART

Renewable hydrocarbons suitable for use as fuels, such as diesel fuel, aviation fuel and/or gasoline, are presently produced from renewable feedstocks by hydrotreatment. Sources of renewable feedstock have been e.g. oils or fats of plants or animals or fish, and nowadays increasingly even waste and residues, such as used oils or fats and side streams and wastes from varying process facilities. Various reactions take place during hydrotreating depending on the feedstock. Hydrotreating reactions may include at least double bond hydrogenation, hydrodeoxygenation (HDO), hydrodesulfurization (HDS), hydrodenitrification (HDN), hydrodearomatisation (HDA), hydrocracking (HC) and hydroisomerisation.

Hydrotreatment reactions commonly involve use of a hydrotreatment catalyst. Hydrodeoxygenation i.e. oxygen removal may be performed in the presence of a sulphided NiMo, CoMo or CoNiMo catalyst on an alumina support, whereas hydroisomerisation i.e. branching of the hydrocarbons is typically done on a bifunctional catalyst having both metal dehydrogenation function and acidic function, for example Pt or Pd catalysts together with molecular sieves such as SAPO-11. These catalysts are typically sensitive to impurities and tend to be deactivated over time evidenced by decline in the rate of hydrotreatment, or eventually total inability.

In search of increasing the feedstock sustainability and broadening the feedstock supply, lower quality feedstocks are taken into use, exemplified by waste and residue materials containing several different types of contaminants or impurities.

Contaminants in renewable feedstocks, such as phosphorus and metals, are known to cause operating problems, especially in hydrotreatment. Some of the low quality feedstocks specifically comprise biogenic lipids which contain high amounts of impurities, such as metals like Fe, Ca, Na, and Mg, as well as phosphorus containing compounds, which are present in various chemical forms. Typically, such feedstocks contain different types of impurities than feedstocks of fossil origin.

Despite the availability of pre-treatment technologies that can typically decrease the amount of these impurities, it has been impossible so far to completely avert the fouling of hydrotreatment catalyst, as the impurities cannot be fully removed in industrial scale operation. The fouling of the catalyst leads to an increased rate of deactivation, shortening the lifetime and life cycle of the catalyst, which in turn has important economic consequences as production eventually needs to be interrupted regularly to provide active enough catalyst material to the process.

For example, it has been reported that a build up of "phosphate glass", i.e. difficult phosphorus compounds, can cause pressure drops and accelerate catalyst deactivation. Moreover, phosphorus is considered to most likely coat the external surface of catalysts and block the pores. As the catalyst particles start adhering to each other voids slowly fill up and the likelihood of a pressure drop build-up rises. This is why it is important to specify critical values for concentrations of each contaminant allowed for the feedstock.

Consequently, there is a need to extend the life cycle of hydrotreatment catalysts by reduction of deactivation when using low quality renewable feedstock. It is therefore an aim to provide a method that decreases the amount of harmful impurities in a feedstock directed to a catalytic process, which impurities specifically cause deactivation of a hydrotreatment catalyst.

OBJECTS AND SUMMARY OF THE INVENTION

An object of the present invention is to provide a process that facilitates the use of low quality renewable feedstocks in manufacturing hydrocarbons by hydrotreatment.

A further object of the present invention is to reduce deactivation of a main active hydrotreatment catalyst when using low quality renewable feedstocks in manufacturing hydrocarbons by hydrotreatment.

The present disclosure is defined by the features of the independent claim. Some specific embodiments are defined in the dependent claims.

According to one aspect, a method for reducing deactivation of a hydrotreatment catalyst is provided, wherein the hydrotreatment catalyst is used as a main active catalyst for producing renewable hydrocarbons by hydrotreatment from a renewable feedstock comprising at least an oxygen containing compound, at least one metal containing compound and at least one phosphorus containing compound as impurities, said method comprising the steps of i. adjusting the metal to phosphorus (M:P) weight ratio of the renewable feedstock to a value within the range of from 0.70 to 1.26, measured as elemental metal and elemental phosphorus, to obtain an impurity adjusted renewable feedstock, and ii. subjecting the impurity adjusted renewable feedstock to a temperature from 190 to 400° C. under reducing conditions, thereby forming a solid precipitate comprising at least one metal and phosphorus containing compound, and a purified liquid renewable feedstock, and iii. contacting the purified liquid renewable feedstock with the main active catalyst, in the presence of hydrogen.

Enhanced purification of renewable feedstock from as many impurities as possible, and to as low impurity amount as possible, is a typical solution proposed in the prior art. However, purification of the feedstock up to the hilt before entering it into the catalytic processing is costly and typically requires specific pre-treatment methods and apparatus thereto. Purification issues become even more pronounced, difficult and costly when waste and residue materials containing high amounts of various impurities, and especially so called difficult impurities, are taken into use. By the term difficult impurities is meant impurities that are not removable by commonly applied pre-treatment processes, typically impurities that comprise complicated chemical compounds with undesired properties, such as solubility properties. Thus, costs escalate the higher the required purity levels are.

By contrast, the present disclosure does not propose a solution based on minimising the feed impurity levels. Instead, it proposes adjusting the weight ratio of metals (M) and phosphorus (P) in the feed, such that it is possible to precipitate the impurities into a less harmful form before they reach the critical part of the processing, such as the main active catalyst. Although the present disclosure does not call for a substitution of the known pre-treatment purification technologies, it still provides a possibility to refine renewable feedstocks having high impurity content without the need for extensive investments in development of the known pre-treatment technology or equipment.

DETAILED DESCRIPTION OF THE INVENTION

Figure 1:
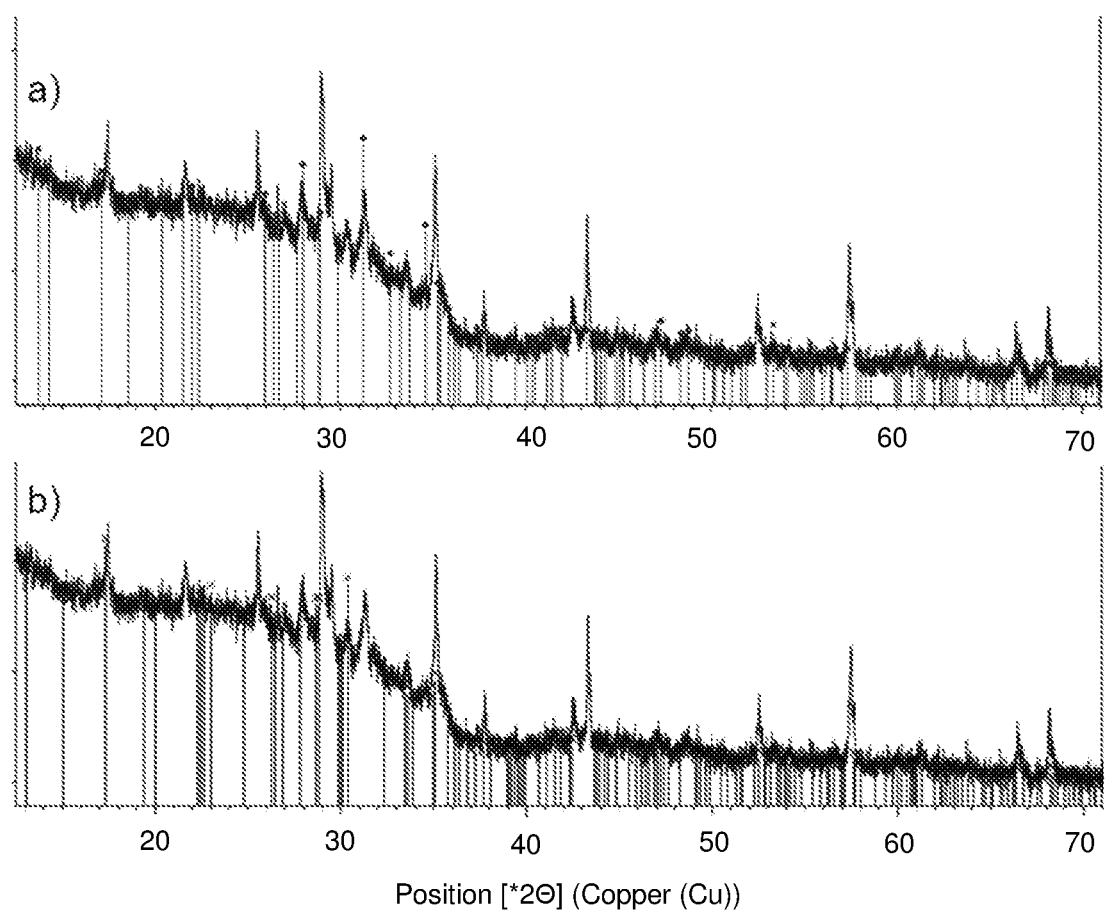
FIG. 1 shows the metal phosphate phases formed and identified using X-ray diffraction (XRD) analysis of a sample of impurity-based dust from a batch of spent catalyst wherein a) depicts calcium iron phosphate and b) sodium iron phosphate.

In describing the embodiments of the present disclosure, specific terminology will be resorted to for the sake of clarity. However, the present disclosure is not intended to be limited to the specific terms so selected, and it is understood that each specific term includes all technical equivalents, which operate in a similar manner to accomplish a similar purpose.

In the present description, weight percentages (wt-%) are calculated based on the total weight of the material in question (typically a blend or a mixture). Any amounts defined as ppm (parts per million), are based on weight.

The term "renewable" in the context of renewable feed, renewable feedstock or renewable fuel or fuel component refers to one or more organic compounds derived from any renewable source (contrary to source of fossil origin). Thus, the renewable fuel component is based on renewable sources and consequently does not originate from or is not derived from any fossil-based material. By the term fuel, are understood both fuels usable as such as well as fuel components, which fulfil the requirements of standards for the respective use. For example, within the EU, the standard for gasoline is EN 228 (2017), for paraffinic diesel EN 15940 (2019), and for aviation turbine fuel containing synthesised hydrocarbons D7566 (2020).

The $^{14}C$-isotope content can be used as evidence of the renewable or biological origin of a feedstock or product. Carbon atoms of renewable material comprise a higher number of unstable radiocarbon ($^{14}C$) atoms compared to carbon atoms of fossil origin. Therefore, it is possible to distinguish between carbon compounds derived from biological sources, and carbon compounds derived from fossil sources by analysing the ratio of $^{12}C$ and $^{14}C$ isotopes. Thus, a particular ratio of said isotopes can be used to identify and quantify renewable carbon compounds and differentiate those from non-renewable i.e. fossil carbon compounds. The isotope ratio does not change in the course of chemical reactions. Example of a suitable method for analysing the content of carbon from biological sources is ASTM D6866 (2020). An example of how to apply ASTM D6866 to determine the renewable content in fuels is provided in the article of Dijs et al., Radiocarbon, 48(3), 2006, pp 315-323. For the purpose of the present invention, a carbon-containing material, such as a feedstock or product, is considered to be of renewable origin if it contains 90% or more modern carbon (pMC), such as about 100% modern carbon, as measured using ASTM D6866.

In this disclosure, when feedstock is discussed, both the first and the further feedstocks are meant, unless otherwise specified. Further, in this disclosure, "at least one" means that there is one or more of the items mentioned.

By "weight ratio" is meant the ratio of species a to species b, wherein the amount of species a and species b are determined in terms of weight, such as ppm (mg/kg), in the feedstock, using an appropriate method thereto, like inductively coupled plasma (ICP) or ICP coupled with atomic emission spectrometry (ICP-AES) or tandem inductively coupled plasma-mass spectrometry (ICP-MS/MS). The weight amount is calculated as the amount of the species in question in elemental form.

Renewable feedstock can be any kind of animal, plant or fish based material containing oxygen. The oxygen in the feedstock may originate from, for example, triglycerides and/or free fatty acids of the feedstock material.

In one embodiment, the renewable feedstock of the present disclosure contains triglycerides, free fatty acids, or both.

More specifically, in one embodiment, the feedstock is selected from the group consisting of:
plant fats, plant oils, plant waxes; animal fats, animal oils, animal waxes; fish fats, fish oils, fish waxes;
fatty acids, bound or free fatty acids obtained from plant fats, plant oils, plant waxes; animal fats, animal oils, animal waxes; fish fats, fish oils, fish waxes; and mixtures thereof by e.g. hydrolysis, transesterification or pyrolysis;
esters obtained from plant fats, plant oils, plant waxes; animal fats, animal oils, animal waxes; fish fats, fish oils, fish waxes; and mixtures thereof by e.g. transesterification;
metal salts of fatty acids obtained from plant fats, plant oils, plant waxes; animal fats, animal oils, animal waxes; fish fats, fish oils, fish waxes, and mixtures thereof by e.g. saponification;
esters obtained by esterification of free fatty acids of plant, animal and fish origin with e.g. alcohols;
fatty alcohols or aldehydes obtained as reduction products of fatty acids from plant fats, plant oils, plant waxes; animal fats, animal oils, animal waxes; fish fats, fish oils, fish waxes, and mixtures thereof;
waste and residues, such as recycled food grade fats and oils;
fats, oils and waxes obtained by genetic engineering;
dicarboxylic acids or polyols including diols, hydroxyketones, hydroxyaldehydes, hydroxycarboxylic acids, and corresponding di- or multifunctional sulphur compounds, corresponding di- or multifunctional nitrogen compounds;
bio-based pyrolysis oils;
compounds derived from algae or wood, and
mixtures of any of the materials listed herein.

In an embodiment, the feedstock is based on a non-edible oil or fat. In another embodiment, the feedstock comprises plant oil. In a further embodiment, the plant oil is obtained as wood-based by-product materials from the forest industry. According to a particular embodiment, the feedstock is selected from waste and residues from animal fat or oil, plant fat or oil, and fish fat or oil, and mixtures thereof.

An exemplary feedstock comprises at least triglycerides. Most typical exemplary feedstocks are animal fats and palm oil fatty acid, especially those originating from waste and residues.

A further exemplary feedstock comprises at least fatty acids. Most typical feedstock are various plant oils, for example tall oil materials, such as crude tall oil.

The natural fats and oils, or derivatives thereof, may be provided in pure form or as part of a feedstock containing other components. Preferably, the feedstock contains at least 20 wt-%, more preferably at least 30 wt-%, most preferably at least 40 wt-%, of pure natural fat or natural oil or their derivatives.

The feedstock may comprise C8-C24 fatty acids, derivatives of said fatty acids, such as esters of fatty acids as well as triglycerides of said fatty acids, metal salts of said fatty acids, or combinations thereof. The fatty acids or fatty acid derivatives, such as esters, may be produced via hydrolysis of bio-oils or by their fractionalization, or by esterification reactions of triglycerides.

The feedstock may also include derivatives of natural fats including mono- or diglycerides of C10-C28 fatty acids, C10-C28 fatty acids, non-glyceride C10-C28 fatty acid esters, C10-C28 fatty alcohols, C10-C28 fatty aldehydes and C10-C28 fatty ketones. The C10-C28 fatty acids, their mono- and diglycerides, are typically prepared by hydrolysis of the corresponding triglyceride. The non-glyceride C10-C28 fatty acid esters are mainly prepared from the triglycerides by transesterification. The C10-C28 fatty alcohols, aldehydes and ketones are prepared by reduction, usually by hydrogenation, of the corresponding fatty acids. Advantageously, the feedstock hydrocarbons may be of C10-C24.

The feedstock may be also selected from lauric-myristic acid group (C12-C14) including milk fats, palmitic acid group (C16) including earth animal fats, stearic acid group (C18) including earth animal fats, linoleic acid group (unsaturated C18) including whale and fish oils, erucic acid group (unsaturated C22) including whale and fish oils, oleo stearic acid group (conjugated unsaturated C18) including whale and fish oils, fats with substituted fatty acids (ricin oleic acid, C18) such as castor oil, oils obtained from plants by gene manipulation, and mixtures of any two or more thereof.

The derivatives of natural fats also include any of the aforementioned natural fats and derivatives, the hydrocarbon chain of which has been modified e.g. by substitution, branching or saturation.

The oils of the feedstock may be classified as crude, degummed, heat treated and RBD (refined, bleached and deodorised) grade, depending on the level of pre-treatment and residual phosphorus and metals content. Animal fats and/or oils may include inedible tallow, edible tallow, technical tallow, floatation tallow, lard, poultry fat, poultry oils, fish fat, fish oils, and mixtures of any two or more thereof. Greases may include yellow grease, brown grease, waste vegetable oils, restaurant greases, trap grease from municipalities such as water treatment facilities, and spent oils from industrial packaged food operations, pyrolysis oils, and mixtures of any two or more thereof.

According to an embodiment, the feedstock used in the present disclosure comprises at least one of animal fat, animal oil, plant fat, plant oil, fish fat, fish oil, microbial oil, algae oil, waste fat, waste oil, residue fat, residue oil, a sludge originating from plant oil production. In case more than one or two or more feedstocks are used, the above may apply to all the feedstocks.

By low quality feedstock is meant herein feedstock that is difficult to purify by well known pre-treatment or purification methods. Typically it may include specific difficult to remove impurities, and it often originates from wastes and residue materials. On the other hand, some materials suitable as feedstock may inherently contain various impurities which are difficult to remove with conventional methods, or are just inherently abundant on specific impurities.

In one embodiment, the triglycerides and/or free fatty acids originate from feedstock comprising at least one of acidulated soapstock, poultry fat, dry rendered poultry fat, brown grease, used cooking oil, tall oil, fraction of tall oil, crude tall oil, tall oil pitch, palm oil mill effluent, crude palm oil, palm oil, palm seed oil, palm fatty acid distillate, babassu oil, carinata oil, coconut butter, muscat butter oil, sesame oil, maize oil, poppy seed oil, cottonseed oil, soy oil, laurel seed oil, jatropha oil, palm kernel oil, camelina oil, archaeal oil, bacterial oil, fungal oil, protozoal oil, algal oil, seaweed oil, mustard seed oil, oils from halophiles, soybean oil, technical corn oil, rapeseed oil, colza oil, canola oil, sunflower oil, hemp seed oil, olive oil, linseed oil, mustard oil, peanut oil, castor oil, coconut oil, lard, tallow, train oil, spent bleaching earth oil, lignocellulosic based feeds, or mixtures thereof.

According to another embodiment, the renewable feedstock and the further renewable feedstock(s) of the present disclosure comprises at least one of acidulated soapstock, (ASK), poultry fat, dry rendered poultry fat (AFP), brown grease (BG), used cooking oil (UCO), tall oil, fraction of tall oil, crude tall oil (CTO), tall oil pitch (TOP), palm oil mill effluent (POME), crude palm oil (CPO), palm oil, palm seed oil, palm fatty acid distillate (PFAD), babassu oil, carinata oil, coconut butter, muscat butter oil, sesame oil, maize oil, poppy seed oil, cottonseed oil, soy oil, laurel seed oil, jatropha oil, palm kernel oil, camelina oil, archaeal oil, bacterial oil, fungal oil, protozoal oil, algal oil, seaweed oil, mustard seed oil, oils from halophiles, soybean oil (SBO), technical corn oil, rapeseed oil (RSO), colza oil, canola oil, sunflower oil, hempseed oil, olive oil, linseed oil, mustard oil, peanut oil, castor oil, coconut oil, lard, tallow, train oil, spent bleaching earth oil (SBEO), lignocellulosic based feeds, or mixtures thereof.

There may be plenty of impurities present in a renewable feedstock comprising vegetable oils and animal fats containing biogenic lipids. The various possible renewable feedstocks, and especially when originating from e.g. waste and residue materials, may include very high amounts of impurities, particularly phosphorus or metals or both. As an example, acidulated soapstock and poultry fat may comprise 100-400 ppm of phosphorus, while some oils and fats originating from algae may have several thousands of ppms of phosphorus. Brown grease typically has a phosphorus content that is below 100 ppm, while the amount of metals can be hundreds or thousands of ppms. In the method of the present disclosure, the low quality feedstocks initially having high contents of phosphorus and/or metals are preferably pretreated using conventional pre-treatment methods to lower the initial amount of impurities to a reasonable level. Typically, this level may, however, not be low enough to enable subsequent hydrotreatment. The present disclosure provides a method enabling the use of a feedstock still having an excess amount of phosphorus and/or metals to be processed without reducing the hydrotreatment catalyst lifetime.

The renewable feedstock of the present disclosure may originally comprise
- phosphorus, in an amount of at least 50 ppm, or at least 100 ppm, or at least 200 ppm, or at least 300 ppm, or at least 400 ppm, or at least 500 ppm;
- at least one metal, in an amount of at least 200 ppm, or at least 500 ppm, or at least 1000 ppm; or
- both phosphorus and at least one metal.

The metals typically comprise alkaline or alkaline earth metals, and some transition metals, such as Fe, Co, Ni or Cu. In one embodiment, the metals may be selected from the group consisting of Na, K, Mg, Ca, Fe, Cu, Mn, Zn, or any combinations thereof.

During the adjustment, all metals present in the feedstock are considered along with phosphorus. The feed comprises one or more different metal containing compounds, such as 1, 2, 3, 4, 5, 6, 7 or 8 different metal containing compounds. The feedstocks may also comprise some metals in very low amounts which are near or beyond the detection limits. These are not considered to essentially influence the process. Thus, typically, those metals that are present in a significant amount, or an amount that is above the detection limit, are taken into account. The limit may be for example 1 ppm by weight. The feed may also comprise certain metals in amounts that cannot be detected, and such metals and their effect on the weight ratio of metal to phosphorus cannot thus be taken into account in the adjustment, while they do participate in the reaction. The amounts are however so small that they essentially do not effect the outcome. The limit may be 1 ppm, or 0.5 ppm, or 0.1 ppm.

The amount of phosphorus is measured by weight of elemental phosphorus (ppm) and the amount of metals as the total weight amount of elemental metals (ppm), using e.g. ICP-AES (ASTM D-5185 (2018)).

The present inventors have found biphosphates and polyphosphates in the spent catalysts and dusts, indicating that the stoichiometry of the reactions is not straightforward. Additionally, the reason why the amounts of phosphorus and metals are given as elemental phosphorus and elemental metals is that the molecular or ionic form of these are difficult to measure at the levels required in the last step, when contacting the purified liquid renewable feedstock with the main active catalyst, in the presence of hydrogen. The range of metal to phosphorus (M:P) weight ratio given has been found empirically, and corresponds to the range within which precipitates can be obtained.

The phosphorus impurities may be contained in the feedstock in various chemical forms in varying phosphorus containing compounds, such as in the form of phospholipids, oils or water soluble or insoluble phosphorus compounds, or inorganic phosphates, diphosphates, and phosphites. Typical phosphorus containing compounds may further comprise glycerophospholipids, sphingolipids, phosphatidic acid complexes, phosphatidylethanolamines, nucleoside phosphates, apatite or bone meal (calcium phosphate), and the like.

The metal impurities may be contained in the feedstock similarly in various forms in varying metal containing compounds, organic or inorganic, in water soluble or oil soluble or insoluble forms.

The high amount of impurities in a renewable feedstock used for producing renewable hydrocarbons may eventually enter into the renewable fuels like diesel, aviation fuel or gasoline if not removed in the processing. Moreover, impurities in the hydrotreatment typically cause several problems in the processing itself. Despite the availability of known pre-treatment technologies that can remove some of these impurities, it has not been possible thus far to completely avert fouling of the catalyst used in the hydrotreatment process due to accumulation of the impurities into the catalyst over time. Impurities contained in the most difficult feeds or feedstocks have not been successfully and economically reduced or removed to a desired extent using the presently available pre-treatment methods.

Fouling of a hydrotreatment catalyst typically leads to an increased rate of deactivation, shortening the lifetime of the catalyst. This in turn has important consequences, as the deteriorated functionality of the catalyst leads eventually to a need to regenerate the catalyst or, most often, to change the catalyst to a fresh one. A catalyst change in an industrial refinery scale means that production needs to be interrupted during the change of the catalyst. And evidently, the change of the catalyst is needed regularly, just dependent on the length of the lifetime of the catalyst. Thus, being able to lengthen the lifetime of the catalyst would, no doubt, lead to higher productivity through less frequent interruptions of production, and subsequent production loss.

Catalyst deactivation, i.e. the loss over time of catalytic activity and/or selectivity, is a great and continuing concern in industrial catalytic processes. Costs to industry for catalyst replacement and process shutdown add up into considerable economic losses per year. Time scales for catalyst deactivation may vary considerably depending on the process and the catalyst types used. Some catalysts last for a few seconds whereas some may last for tens of years. Nevertheless, it is inevitable that all catalysts will eventually deactivate. Typically, the loss of activity and/or selectivity in a well-controlled process occurs slowly. However, process upsets or poorly designed hardware can bring about unexpected and early failures. While catalyst deactivation is inevitable for most processes, some of its drastic consequences may be avoided and at least postponed by adopting new ways of processing.

By deactivation of a catalyst is meant herein the gradual deterioration of the performance of the catalyst, which eventually reaches a level wherein it is no longer reasonable to continue the use of the catalyst. In this context reasonableness is best depicted by the ability to produce the product that fulfils the predefined quality and quantity criteria. In practice this means that each catalyst will confront a point of time when it is deactivated to an extent requiring a change of the spent catalyst to a fresh one. Thus the deactivation can be described as the catalyst lifetime length per shutdown frequency. This ratio provides a measure for the ability to produce the final product in view of the needed shutdowns for a catalyst change due to deactivation. In other words, less production is lost in a given time frame if there are fewer shutdowns due to catalyst changes originating from catalyst deactivation.

Deactivation of the catalyst is typically defined as impurities residing on a catalyst surface, thus blocking the active sites of the catalyst from the feedstock molecules. Deactivation of the catalyst may be caused by fouling or poisoning of the catalyst. Fouling is generally considered to be related to deposition of insoluble components present in the feed or formed by degradation of the feed or reaction intermediates, whereas poisoning is related to the deposition of electropositive contaminants, such as alkali and alkaline earth metals, on acid sites or electronegative contaminants at hydrogenation sites.

Current technologies typically focus on minimising the amount of impurities in the feedstock by removing them as well as possible, e.g. by expanding, optimising, or enhancing the various purification or separation techniques. The assumption has been that minimising feedstock impurities will minimise catalyst fouling, which in turn will result in a longer catalyst lifetime by a slower accumulation of impurities. It is estimated that using a typical renewable feedstock purified by e.g. degumming and/or bleaching will lead to a level of about 2 wt-% or more of phosphorus accumulated into a hydrotreatment catalyst during the catalyst life cycle whereby the catalyst change usually takes place.

The present disclosure shows that catalyst deactivation can be curbed without increasing the feedstock purification requirements. Instead, the inventors of the present disclosure have found that adjusting the impurity metal to phosphorus weight ratio of the feedstock is required.

In one aspect of the present disclosure, a method for reducing deactivation of a hydrotreatment catalyst is provided, wherein the hydrotreatment catalyst is used as a main active catalyst for producing renewable hydrocarbons by hydrotreatment from a renewable feedstock comprising at least an oxygen containing compound, at least one metal containing compound and at least one phosphorus containing compound as impurities, said method comprising the steps of
  i. adjusting the metal to phosphorus (M:P) weight ratio of the renewable feedstock to a value within the range of from 0.70 to 1.26, measured as elemental metal and elemental phosphorus, to obtain an impurity adjusted renewable feedstock, and
  ii. subjecting the impurity adjusted renewable feedstock to a temperature from 190 to 400° C. under reducing conditions, thereby forming a solid precipitate comprising at least one metal and phosphorus containing compound, and a purified liquid renewable feedstock, and
  iii. contacting the purified liquid renewable feedstock with the main active catalyst, in the presence of hydrogen.

The impurities in the feedstock, the amount of which is to be adjusted, comprise phosphorus and one or more metals, preferably the most abundant and disturbing metals are selected from Na, K, Ca, Mg and Fe. However, this selection may depend on the origin of the feedstock. The phosphorus and metal impurities may be in dissolved form in the feedstock. They are typically in the form of impurity containing compounds. The phosphorus and the one or more metals may also be present in the same impurity compound, but most typically they are in different impurity compounds within the feedstock. In the present description, the purified liquid feedstock means a feedstock comprising less phosphorus and/or metal(s), such as dissolved phosphorus and metal impurities, compared to the original feedstock. By "dissolved impurities" in this text are meant for example impurities which remain in the liquid phase after filtration with 2 μm filter, i.e. impurities in solid form that are removed by such filtration are not considered dissolved impurities in this text.

The present disclosure enables the use of lower quality feedstock without increasing the impurity removal load in the feedstock pre-treatment processing units. Furthermore, the required metal to phosphorus weight ratio could serve as a guideline for selection and handling of feedstock prior to hydrotreatment processing.

Although many impurities found in renewable feedstock, such as biogenic lipids, can foul the hydrotreatment catalyst, it is commonly assumed that the likeliest contributor to deactivation would be phosphorus. Without being bound by any theory, it is anticipated that phosphorus adheres to the catalyst surface and hinders the access of the feedstock to the active sites of the catalyst material. Alternatively, phosphorus may react during hydrotreatment with the metal impurities that are also present in the feedstock, thus forming metal phosphates. These metal phosphates are likely to precipitate as solid particles from the feedstock before the phosphorus and the metal impurities can reach the catalyst surface and foul it. In fact, present inventors have found that an X-ray diffraction (XRD) analysis of a dust sample i.e. precipitate from the spent catalyst beds of a hydrotreatment reactor has revealed the presence of metal phosphate precipitates, such as calcium iron phosphate and sodium iron phosphate (see FIGS. 1a and 1b). It is further believed that phosphorus and metal containing impurities which are already in solid form i.e. in precipitated form in the feedstock no longer adversely react during the hydrotreatment.

One key factor has been identified as contributing to the formation of phosphate-rich solid precipitate. The metal to phosphorus (M:P) weight ratio of the feed has been found to positively correlate with the amount of impurity dust formed during operation of a hydrotreatment reactor with different feedstocks. Different feedstocks have different M:P ratios. The feeds with the M:P ratios close to one were found to form more solid impurity dust than the feeds with lower or higher M:P ratios. Furthermore, the amount of phosphorus attached to the catalyst surface after the same operation time correlated negatively with the feed M:P ratio. The formed solid impurity dust does seem to influence fouling of the catalyst. Therefore, a suitable M:P ratio, such as a ratio close to one, contributes to prevent catalyst fouling and deactivation, and thereby lengthens the lifetime of the catalyst.

The metal to phosphorus (M:P) weight ratio of the renewable feedstock can be for example from 0.70, 0.75 or 0.80 or 0.85 or 0.90 or 0.95 or 1.0 or 1.05 or 1.10 or 1.15 or 1.2 or 1.25 up to 0.75 or 0.80 or 0.85 or 0.90 or 0.95 or 1.0 or 1.05 or 1.10 or 1.15 or 1.2 or 1.25 or 1.26, measured as elemental metal and elemental phosphorus, to obtain an impurity adjusted renewable feedstock. In a preferred embodiment, the metal to phosphorus (M:P) weight ratio of the renewable feedstock is adjusted to a value within the range of from 0.73 to 1.23, such as from 0.76 to 1.20 measured as elemental metal and elemental phosphorus, to obtain an impurity adjusted renewable feedstock. This provides the highest amount of solid precipitate per kilogram of metals and phosphorus in renewable feedstock, thus reducing most efficiently the catalyst deactivation. A high amount of solid precipitate does not reduce the catalyst deactivation, as such, but when a high portion of phosphorus and metals is precipitated out from the feedstock due to the desired metal to phosphorus weight ratio, the amount of unbalanced feedstock, i.e. feedstock containing e.g. high excess amount of phosphorus and a low amount or no metals, to the catalyst is decreased.

The low quality renewable feedstock of the present disclosure is typically collected from various sources in batch type deliveries. Especially the waste and residue feedstocks may arrive to the tank farms by truck transport or by marine vessels from rendering facilities or gathering stations. From the tank farms the feedstocks are directed to refinery areas wherein suitable batches fulfilling the desired feedstock specification criteria are formed for processing. These criteria include determining the impurity profile for each feedstock batch. The feedstock arriving at a refinery typically has an analysis certificate, indicating the amount of various constituents and impurities. Incoming feedstock batches may thus be blended together depending on their properties, such as impurity profiles, to obtain a feedstock suitable for selected processing or pre-treatment processes. In addition, pretreated feedstocks may be stored in storage tanks before processing, from where a selected feed may further be combined to the desired blend to form the final composition to be directed to e.g. a hydrotreatment reactor. Typically, the feedstocks are stored under elevated temperature, such as over 50° C., so as to keep them in liquid form, and to avoid segregation.

In one embodiment, the adjusting of step i may be carried out by blending to the renewable feedstock at least one further renewable feedstock comprising a balancing amount of metal containing compound(s) or phosphorus containing compound(s), whereby the metal to phosphorus weight ratio of 0.70 to 1.26 for the impurity adjusted renewable feedstock is obtained.

It is possible to choose several candidates from the varying impurity profile containing feedstocks that have different impurity profiles and blend those together to obtain a blend fulfilling the desired profile. For example, a feedstock batch of algae oil having 700 ppm of phosphorus but which is very low in metals may be blended with a further feedstock batch of brown grease having a low phosphorus content but a high metal content of 700 ppm, thus obtaining a high overall impurity content but a metal to phosphorus weight ratio close to unity.

In one embodiment, the balancing amount of metal containing compound or phosphorus containing compound is determined by
first determining the amount of metal (M1) and phosphorus (P1) in weight-% for the renewable feedstock, and
secondly determining the amount of metal (M2) and phosphorus (P2), in weight-% for the at least one further renewable feedstocks, and
thirdly selecting the at least one further feedstock and amount thereof to satisfy the weight ratio of total metal (M1+M2) amount to the total phosphorus (P1+P2) amount requirement of from 0.70 to 1.26.

The number of renewable feedstock batches to be blended together is not relevant, provided that the final blend obtained fulfils the required provision having the metal to phosphorus weight ratio of the blended feedstock within the range of from 0.70 to 1.26, measured as elemental metal and elemental phosphorus. There may be several renewable feedstock batches having varying metal impurity M1, M2, M3, etc. and phosphorus impurity P1, P2, P3, etc. profiles. Once analyzed and categorized the feedstock batches may be blended together in suitable and optimized proportions based on calculated phosphorus and metal impurity concentrations thereof.

Blending together suitable impurity profile renewable feedstocks is not the only way to achieve the desired metal to phosphorus ratio. The required amounts of phosphorus and metals may be directly added into the renewable feedstock in question in the form of ionic chemical compounds. This applies to both adding metal containing compounds and adding phosphorus containing compounds. However, it is considered a preferred option to balance the amount of excess phosphorus with an addition of a metal containing compound than vice versa.

The adjusting of step i may carried out by adding a metal containing compound, such as ionic metal containing compound, like a hydroxide or a fatty acid salt, or a phosphorus containing compound, such as phosphoric acid or a phospholipid, to the renewable feedstock whereby the metal to phosphorus weight ratio of 0.70 to 1.26 for the impurity adjusted renewable feedstock is obtained. In a preferred embodiment, the adjusting in step i is carried out by adding at least one metal containing compound to the renewable feedstock whereby the metal to phosphorus weight ratio of 0.70 to 1.26 for the impurity adjusted renewable feedstock is obtained. Typically the problematic impurity is the phosphorus containing compound in the feedstock, and not the metal containing compound. There are efficient methods, such as pre-treatment methods, available for removing excess metals from the feedstock, which may be conveniently used. The removal of phosphorus is considered to be more problematic. However, it is also possible to balance the excess of metals by adding phosphorus containing compounds, if necessary. Therefore, in one embodiment, the adjusting in step i is carried out by adding at least one phosphorus containing compound to the renewable feedstock whereby the metal to phosphorus weight ratio of 0.70 to 1.26 for the impurity adjusted renewable feedstock is obtained.

Examples of metal containing compounds that may be added to the renewable feedstock are compounds capable of providing metal cations including metal hydroxides, such as sodium hydroxide, potassium hydroxide, calcium hydroxide, magnesium hydroxide, iron hydroxide, and the like; metal salts of fatty acids, such as sodium soap, potassium soap, calcium soap, magnesium soap, iron soap, and the like; or mixtures thereof. In this context, the fatty acid may be e.g. a stearic acid forming a sodium salt, such as sodium stearate, or any other suitable fatty acid. The metals may comprise alkaline metals, such as Li, Na, K; alkaline earth metal, such as Mg, or Ca; and transition metals, such as Fe, Co, Mn; or even Al. It is preferred to use a metal containing compound that will not provide the feedstock with further species interfering with the subsequent processing.

In one embodiment, the at least one metal containing compound is an ionic metal containing compound, preferably a hydroxide or a fatty acid salt.

Examples of possible phosphorus containing compounds are phosphoric acid, phospholipids, and the like.

The needed amount of the one or more chemical balancing compound to be added may be calculated based on the metal amounts or phosphorus amounts of the feedstock to be used, the summed up metal to phosphorus ratio fulfilling the provision from 0.70 to 1.26 range.

In one embodiment, the required amount of the metal containing compound to be added is determined by
first determining the amount of metal (M1) and phosphorus (P1) in weight-% for the renewable feedstock, and
secondly calculating as elemental metal the required amount of metal containing compound (M2') to be added to achieve the total metal (M1+M2') to phosphorus weight ratio of 0.70 to 1.26 for the impurity adjusted renewable feedstock.

Some of the feedstocks may be purified by a known pre-treatment method before or after balancing the metal and phosphorus weight ratio thereof. The success in lowering the amount of impurities by a selected pre-treatment method depends on the feedstock type. For example, feedstocks such as acidulated soapstock (ASK), dry rendered poultry fat (AFP) and brown grease (BG) cannot be purified on their own using mere bleaching to an extent that they would thereafter be suitable for catalytic hydrotreatment. Typically, in acidulated soapstock or poultry fat based feedstock, a high amount of residual phosphorus remains after the conventional purification methods. Whereas for brown grease, the main problem is the high content of metals. The content of metals may be so high that a very high filtration resistance, or even plugging can be observed in bleaching of brown grease. These types of feedstocks benefit clearly from the metal to phosphorus adjustment.

In a further embodiment, the renewable feedstock is subjected to pre-treatment before or after the adjusting of step i. Preferably, the amount of metal containing compounds and phosphorus containing compounds in the renewable feedstock are reduced into a value less than 20 ppm, preferably less than 10 ppm, of metals calculated as elemental metal and less than 20 ppm, preferably less than 10 ppm, of phosphorus calculated as elemental phosphorus, measured by ICP-AES.

The adjusting of the metal and phosphorus may be combined with a pre-treatment method which may comprise for example filtration, settling, centrifugation, water washing, degumming or bleaching depending on the residual impurities present in the feedstock. In one embodiment, the pre-treatment comprises filtration, settling, centrifugation, water washing, degumming or bleaching or any combinations thereof.

The adjustment of step i according to the present disclosure may further take place by selectively decreasing the amount of phosphorus containing impurities, or possibly alternatively the metal containing impurities, by a selected pre-treatment method or combinations thereof if applicable, depending on the level of the impurity. In one embodiment the adjusting in step i is carried out by reducing the amount of phosphorus containing compound or metal containing compound by pre-treatment of the renewable feedstock, such as bleaching or degumming or both, to a level wherein the metal to phosphorus weight ratio of 0.70 to 1.26 for the impurity adjusted renewable feedstock is obtained.

It is also possible to combine the above described methods for adjusting the metal and phosphorus impurity amounts. Therefore, in a further embodiment of the present disclosure the adjusting in step i is made by any combination of the methods of
- blending to the renewable feedstock at least one further renewable feedstock comprising a compensating amount of metal containing compound or phosphorus containing compound,
- adding a metal containing compound to the renewable feedstock,
- reducing the amount of phosphorus containing compound or metal containing compound by pre-treatment, whereby the metal to phosphorus weight ratio of 0.70 to 1.26 for the impurity adjusted renewable feedstock is obtained.

Once the feedstock has been balanced for the appropriate metal to phosphorus ratio, it is subjected to an elevated temperature. The pressure and ambient conditions at the elevated temperature may vary, preferably the feedstock is subjected to an elevated temperature under reducing conditions comprising the presence of hydrogen or water, such as water vapour or steam. It was found that just briefly subjecting the balanced feed to a temperature between 190-400° C. is enough to cause solid precipitation in the form of dust. The exposure time may be only from a few minutes up to a few hours depending on the harshness of the temperature. The resulting feed stream thus comprises fine-grained solid dust precipitate and purified liquid renewable feedstock for the catalytic hydrotreatment. In one embodiment, the elevated temperature in step ii is from 240° C. to 380° C., such as from 250° C. to 370° C., or even from 260° C. to 360° C. Especially temperatures falling within the processing temperatures, such as hydrotreatment or hydrodeoxygenation temperatures in the related reactors, are favoured as no separate heat treatment unit is thus necessary. According to an embodiment, the treatment at an elevated temperature may be carried out at the temperatures of, for example, from 190, 195, 200, 205, 210, 215, 220, 225, 230, 235, 240, 245, 250, 255, 260, 265, 270, 280, 285, 290, 295, 300, 305, 310, 315, 320, 325, 330, 335, 340, 345, 350, 355, 360, 365, 370, 375, 380, 385, 390 or 395° C. up to 200, 205, 210, 215, 220, 225, 230, 235, 240, 245, 250, 255, 260, 265, 270, 280, 285, 290, 295, 300, 305, 310, 315, 320, 325, 330, 335, 340, 345, 350, 355, 360, 365, 370, 375, 380, 385, 390, 395, 400° C. The elevated temperature is selected such that an optimal result in removal of the impurities is obtained. The temperature may depend to some extent on the reaction time. The temperature may further be selected based on the other steps of the process. The temperature may also depend on the impurities to be removed, and their reactions into metal phosphates. Also the size of the part of the reactor used for step ii heat treatment may play a role in the choice of the optimal temperature as well as side reactions, as some feedstock may comprise components that start to oligomerize or crack in certain temperatures.

Phospholipids typically start to decompose in a temperature around 180° C., however, for full decomposition a longer retention time may be needed and it is often more practical to use a higher treatment temperature.

The feedstock is subjected to the elevated temperature for a period of time from 0.5 minutes to 2 hours. The required time typically depends on the temperature, and the higher the temperature, the shorter the required treatment time. Some feedstocks may also be more sensitive to heating than others. The duration of the heat treatment can thus be for example from 0.5 min, 1 min, 5 min, 10 min, 15 min, 30 min, 45 min, 1 hour, 1 hour 15 min, or 1 hour 30 min up to 30 min, 45 min, 1 hour, 1 hour 15 min, 1 hour 30 min, 1 hour 45 min or 2 hours. In favourable conditions the precipitation followed by the treatment at elevated temperature has been found to be instantaneous, thus a very short exposure may be sufficient. Preferably, the heat treatment at an elevated temperature is from 0.5 min to 1 h 30 min, such as from 1 min to 1 hour, or even from 2 min to 50 min By the treatment at elevated temperature is herein meant the effective time, which a person skilled in the art is readily able to calculate based on the reactor type and the residence time therein, whether the process is a continuous or a batch process, and on the time of the needed heating and cooling.

Typically, the feedstock is subjected to an elevated temperature in a pressure reactor, and the pressure may be 2-20 MPa. The treatment may be carried out at an elevated hydrogen pressure or at a pressure lower than the equilibrium pressure.

After subjecting the feedstock to an adjustment of the beneficial metal to phosphorus ratio and to a subsequent exposure to elevated temperature to enable the precipitation of the phosphorus and metal containing compounds from the feedstock, a purified liquid renewable feedstock is obtained. This purified liquid feedstock may now be directed to a hydrotreatment catalyst together with hydrogen for at least catalytic reduction or removal of oxygen, and for branching of the formed hydrocarbon chains by isomerisation to obtain a branched hydrocarbon blend suitable for e.g. renewable fuel or renewable chemicals purposes. Hydrotreatment may be realised by combined hydrodeoxygenation and isomerisation or by sequential hydrodeoxygenation and isomerisation. Therefore, in one embodiment the hydrotreatment comprises hydrodeoxygenation; combined hydrodeoxygenation and isomerisation; or sequential hydrodeoxygenation and isomerisation.

The term "hydrotreating" or "hydrotreatment" refers herein to a chemical unit operation in which reaction of hydrogen is used to remove impurities, such as oxygen, sulphur, nitrogen, phosphorous, silicon and metals, especially as part of oil refining. Hydrotreatment also encompasses hydroisomerisation. Hydrotreatment can be performed in one or several steps, in one or more reactor units, or in one or more catalyst beds. Preferably, the hydrotreatment is carried out in two steps. For example, a hydrotreatment in one step may consist of combined hydrodeoxygenation and hydroisomerisation, and a hydrotreatment in two steps may consist of first a hydrodeoxygenation step, followed by a hydroisomerisation step. Preferably, hydrotreatment comprises first hydrodeoxygenation with a subsequent isomerisation step.

The term hydrotreatment as used herein essentially refers to hydrodeoxygenation (HDO), i.e. removal of oxygen as water in the presence of molecular hydrogen under the influence of a (HDO) catalyst; hydroisomerisation, i.e. branching n-paraffins to form i-paraffins in the presence of molecular hydrogen under the influence of a hydroisomerisation catalyst of; hydrodesulphurisation (HDS), i.e. removal of sulphur as hydrogen sulphide by means of molecular hydrogen under the influence of a (HDS) catalyst; hydrodemetallisation (HDM), i.e. removal of metals by trapping them with a (HDM) catalyst; hydrodenitrification (HDN), i.e. removal of nitrogen by means of molecular hydrogen under the influence of a (HDN) catalyst; hydrodearomatisation (HDA), i.e. saturation or ring opening of aromatics by means of molecular hydrogen under the influence of a (HDA) catalyst. Typically, hydrotreatment means deoxygenation by hydrogenation i.e. hydrodeoxygenation (HDO) and hydrogenation of the possible double bonds present. The effluent of the hydrotreatment is essentially paraffinic hydrocarbons, containing less than 1 wt-% of oxygen with only trace amounts of possible impurities.

Hydrotreatment may comprise hydrodeoxygenation and isomerisation, wherein a temperature in the range from 200 to 400° C., a pressure in the range from 1 to 20 MPa, such as from 2 to 15 MPa, or even from 3 to 10 MPa and a hydrogen flow in the range from 100 to 1500 Nl $H_2$/l feed are used. The expression Nl $H_2$/l means normal litres of hydrogen per litre of the feed into the HDO reactor. According to one particular embodiment, the hydrodeoxygenation reaction conditions comprise a temperature in the range from 250 to 400° C., a pressure in the range from 2 to 12 MPa, a WHSV (weight hourly space velocity) in the range from 0.5-3 $h^{-1}$, and hydrogen flow of 350-900 Nl $H_2$/l feed, and a hydrodeoxygenation catalyst.

The hydrotreatment may be performed at a temperature from 270 to 380° C., such as from 275 to 370° C., or from 285 to 360° C. The temperature may be for example from 270, 275, 280, 285, 290, 295, 300, 305, 310, 315, 320, 325, 330, 335, 340, 345, 350, 355, 360, 365, 370 or 375° C. up to 275, 280, 285, 290, 295, 300, 305, 310, 315, 320, 325, 330, 335, 340, 345, 350, 355, 360, 365, 370, 375 and 380° C. The pressure during hydrotreatment may be from 2 to 12 MPa. The pressure can be for example from 2, 3, 4, 5, 6, 7, 8, 9, 10, 11 or 12 MPa up to 3, 4, 5, 6, 7, 8, 9, 10, 11 or 12 MPa.

In particular in the case of HDO, the weight hourly space velocity (WHSV) may be within the range from 0.25 to 3.0 $h^{-1}$, preferably from 0.7 to 3.0 $h^{-1}$, depending on the hydrogen consumption. The hydrogen gas flow, especially for HDO, may be in the range from 100 to 1500 Nl $H_2$/l feed, more preferably from 250 to 900 Nl $H_2$/l feed. In one embodiment, the main active catalyst comprises a catalyst suitable for hydrodeoxygenation, or combined hydrodeoxygenation and hydroisomerization.

In one embodiment, the hydrodeoxygenation is performed in a hydrodeoxygenation reactor or zone, in the presence of at least the main active catalyst, comprising a metal on a support. The main active hydrotreating catalyst typically comprises at least one component selected from IUPAC group 6, 8 or 10 of the Periodic Table. Specifically, the main active hydrotreatment catalyst comprises at least one of nickel, molybdenum, cobalt, tungsten, and combinations thereof. The main active catalyst may, for example, comprise NiMo, CoMo, NiW or CoNiMo. The main active hydrotreatment catalyst has typically a support comprising at least one of alumina, silica, zeolite, and a combination thereof. In particular, the main active hydrotreating catalyst may be a sulfided NiMo or CoMo catalyst. In case the feed, even after purification, comprises sulphur, the catalyst does not necessarily need to be sulphided. In one embodiment, the hydrodeoxygenation is performed in a hydrodeoxygenation reactor or zone in the presence of at least one main active catalyst, comprising a metal on a support. In a further embodiment, the metal comprises Ni, Mo, Co, W or any combination thereof, and the support comprises alumina, silica, zirconia, zeolite or mixtures thereof.

According to an embodiment, the hydrotreatment conditions are tailored to best serve the stream in question. In practice, this may mean that according to the desired end product, the reaction conditions and the catalyst used may vary slightly.

The step of hydrotreatment may also comprise mixing the feedstock purified with the present process with another renewable feedstock or several different renewable feedstocks for co-hydrotreating them.

Hydrodeoxygenation may be carried out as depicted e.g. in FI 100248, EP 1741768, WO 2007/068795, WO 2016/062868 or EP 2155838, and using a conventional hydrotreatment catalyst as the main active catalyst, in the presence of hydrogen.

Advantageously, HDO is performed to obtain hydrodeoxygenated material comprising less than 1 wt-% oxygen.

Part of the deoxygenated material may be recycled to the hydrodeoxygenation process. Preferably, the ratio of the purified liquid renewable feedstock obtained by the method of the present disclosure to the recycled hydrodeoxygenated material is from 1:1 to 1:20.

The hydrodeoxygenation and hydroisomerisation may be conducted in one or more reactors, parallel or in sequence. The reactors may further contain one or more catalyst beds of the same or varying amounts of catalyst therein. The fresh feed may be directed to any one or all of the catalyst beds of the reactor set up used, and the feed flows to the catalyst beds may vary between the separate beds.

Both the hydrodeoxygenation step and hydroisomerisation step may be conducted in the same reactor, and even in the same reactor bed. The hydroisomerisation catalyst may be a noble metal bifunctional catalyst such as a Pt containing commercial catalyst, for example Pt-SAPO or Pt-ZSM or for example a non-noble catalyst, such as NiW. The hydrodeoxygenation and hydroisomerisation steps may be performed in the same catalyst bed using e.g. the NiW catalyst for both, hydrodeoxygenation and isomerisation.

According to one embodiment, the hydroisomerisation catalyst comprises at least one of platinum, palladium, nickel and combinations thereof, a zeolite selected from ZSM-12, ZSM-23, SAPO-11, SAPO-41 and fernerite, on a support of alumina and/or silica.

The isomerisation step can be performed at a temperature from 200 to 400° C., such as from 280 to 370° C., or from 300 to 350° C. Pressure may be from 1 to 6 MPa, or from 2 to 5 MPa, or from 2.5 to 4.5 MPa. The WHSV may be from 0.5 to 3 l/h, such as from 0.5 to 2 l/h, or from 0.5 to 1 l/h, and $H_2$ flow may be from 100 to 800 Nl $H_2$/l feed, or from 200 to 650, or even from 350 to 500 Nl $H_2$/l feed.

During isomerisation n-paraffins are branched, forming i-paraffins. Preferably, the conditions are chosen such that the branches are located at or near the terminal ends of the molecules, and therefore the cold flow properties of renewable fuels are improved.

The isomerisation treatment is a step which predominantly serves to isomerise the hydrodeoxygenated raw material. That is, while most thermal or catalytic conversions (such as HDO) result in a minor degree of isomerisation, usually less than 5 wt-%, the isomerisation step which may be employed in the present process is a step which leads to a significant increase in the content of isoparaffins.

Isomerisation, such as hydroisomerisation, may be carried out in a conventional hydroisomerisation unit, such as those depicted in FI 100248, EP 1741768, WO 2007/068795, WO 2016/062868 or EP 2155838. Hydroisomerisation includes adding hydrogen into the reaction.

Most typically, the renewable hydrocarbons produced with the present process and method are used for renewable fuels, such as gasoline, diesel or aviation fuels or chemicals. The renewable hydrocarbons may be used as fuels as such, or they may be used as components of fuels.

The feedstock that has been balanced in terms of adjusting the metal and phosphorus impurity amounts is subjected to an elevated temperature before it is contacted with the main active catalyst of the hydrotreatment. There may be at least one pre-processing zone which is heated to a temperature close to the hydrotreatment temperature, such as to a temperature between 190-400° C. In oil refining there have been various conventional and commercially available solutions for different pre-processing zones, in different or same reactors, such as separate guard reactors including guard beds or grading layers in separate reactors or inside the same reactors as the hydrotreatment takes place. Guard beds and gradings are well known concepts, see e.g. U.S. Pat. No. 5,879,642. Moreover, the hydrotreatment reactors which contain fixed main active catalyst beds of discrete solid materials may include supports or retaining material at their inlet and/or outlet and/or in between the bed layers of materials which are essentially inert to the hydrotreatment reaction. These inert materials may trap at least partly the dust particles in the form of solid impurities i.e. impurity dust, such as phosphorus containing compounds, metal containing compounds, coke particles, catalyst fines, sediments or other entrained foreign particulate material from the reactor inlet feed stream. The trapping of the impurities will prevent undesirable material from plugging, poisoning or deactivating the main active catalyst bed. These inert materials may comprise ceramic materials in the form of pellets or spheres resistant to crushing, high temperatures and high pressures, such as glass spheres, silica and alumina, or any mixtures thereof. Typically, the preprocessing zones do not actively perform e.g. hydrotreatment, as they do not include the same main active hydrotreatment catalyst, but they may include various similar materials capable of at least partially hydrotreating the feedstock, if so desired. Alternatively, they may just act as a mechanical filtering zone for the dust type of feedstock insoluble solid impurities without having any catalytically active material inside. These guard bed or grading material layers are well known in oil refining (see e.g. Riazi, M. R. et al. (editors), Petroleum Refining and Natural Gas Processing, 2013, ISBN 978-0-8031-7022-3 p. 230-231). In recent years, various effective ways and sophisticated constructions have been developed to remove particles such as those described in e.g. WO 2004/094039 A1. In the present disclosure one or more pre-processing zones or layers, such as guard beds or grading layers, may be used comprising a wide range of different materials, such as inert materials in terms of hydrotreatment or materials less active than the main active catalyst of the hydrotreatment. In one embodiment, the hydrotreatment further comprises directing the impurity adjusted renewable feedstock through a heated pre-processing zone, preferably upstream of the main active catalyst.

The guard beds and grading layers may be suitably arranged in various configurations upstream of the hydrotreatment reactor or inside the hydrotreatment reactor, preferably upstream of the main active hydrotreatment catalyst bed. The aim in using preprocessing zones is to facilitate and enhance generation of dust e.g. via catalytic hydrogenation reactions of phosphorus and metal compounds, and to filter out the formed dusty precipitate from the feedstock before it enters the main active hydrotreatment catalyst bed or beds. Thus, pre-processing zone preferably contains the same or similar catalyst materials as those described for the hydrotreatment. However, the catalytic activity of the pre-processing zone catalysts is lower than that of the main active hydrotreatment catalyst. Several alternatives for different grading and guard bed materials having diverse trapping capacity for multiple metals are commercially available. A man skilled in the art is able to tailor the activity of the pre-processing zone catalyst according to his need. The catalyst used in the pre-processing zones may also be diluted with appropriate inert media. Furthermore, the dilution of the catalyst serves to even out the exothermic reactions and to facilitate temperature control in the hydrotreatment reactor.

In a further embodiment, wherein the heated pre-processing zone comprises a compound having less activity for hydrodeoxygenation than the main active catalyst, such as a compound having no activity for hydrodeoxygenation. The grading or guard bed may contain the same catalyst materials used in a HDO catalyst bed, such as NiMo, however, the activity of the grading or guard bed catalyst is less. The catalyst activity may be decreased by e.g. diluting the active material with an inert material, modifying the catalyst material composition, or just having a small amount of active material in the layer, such as less than in the main active catalyst layer for the HDO.

Without being bound by any theory, it is believed that during heat treatment of the metal and phosphorus adjusted feedstock at elevated temperature, metal phosphates are formed from the phosphorus containing compounds and metal containing compounds present in the feedstock, as has been found in the spent catalyst bed analysis (see FIG. 1). Some phosphorus containing compounds, such as specific phospholipids, may need in addition to reducing conditions, such as presence of hydrogen or water, also the presence of a catalyst material having less activity for hydrodeoxygenation than the main active catalyst, to react and to form a convenient solid precipitate. If water is used, it is typically used in an amount of about 1 wt-% or more, such as 3 wt-% or less. The solid dust-like precipitate can effectively be removed from the feedstock by simple separation methods, for example filtering. The metals and phosphorus compounds that have reacted to form the solid precipitate will thus no longer be present in subsequent hydrotreatment processing. Additionally, in hydrotreatment of the purified liquid feedstock, catalyst deactivation can be reduced and the life cycle of the catalyst bed enhanced.

The aim is to balance the metals and phosphorus contents of the feedstock to a sufficient degree, thus enabling metal phosphate formation at a suitable elevated temperature by optimal heat treatment, i.e. ensuring favourable reaction conditions for the metal phosphate formation and subsequent removal of the formed metal phosphate containing solid dust. The impurity dust, i.e. the formed solid precipitate, may be collected during hydrotreating whereby the dust is mostly retained in the hydrotreatment catalyst, but preferably the dust is already removed from the feed before it enters the main active hydrotreatment catalyst, such as the hydrodeoxygenation catalyst. However, it is foreseen that the dust particles retained in or by-passing the hydrotreatment catalyst bed are less harmful than the phosphorous or metal containing compounds in the feedstock before the treatment according to the present disclosure.

Preferably, the feedstock contacted with a hydrodeoxygenation catalyst should not include more than 10 ppm, preferably no more than 5 ppm, more preferably no more than 1 ppm alkali metal and alkaline earth metal impurities, calculated as elemental alkaline and alkaline earth metals; no more than 10 ppm, preferably no more than 5 ppm, more preferably no more than 1 ppm other metals, calculated as elemental metals; no more than 30 ppm, preferably no more than 15 ppm, more preferably no more than 5 ppm phosphorus containing impurities, calculated as elemental phosphorus. For any impurities other than phosphorus, sodium, potassium, magnesium, calcium and iron, any excess amounts may be removed by other methods known per se. The more impure the feedstock is when arriving at the refinery, the more demanding are the methods needed to purify it to fulfil the catalyst requirements and to ensure that the catalyst lifetime or life cycle remains reasonable for the industrial productions purposes.

The formed solid impurity containing precipitates of the present disclosure may contain, for example, iron phosphates, sodium phosphates, potassium phosphates, magnesium phosphates, calcium phosphates, or mixed phosphates thereof, such as sodium iron phosphates, or mixtures of these different types of phosphates. Following the exposure to elevated temperature, most of the metals and phosphorus will no longer be present in the subsequent processing in a harmful form, other than solid precipitate, thus decreasing the catalyst deactivation tendency and rate. The purified liquid renewable feedstock of the present disclosure thus comprises less phosphorus and/or metals compared to the original feedstock. Using pre-processing for removing the solid precipitate enables a reduction of at least 85 wt-% of the solid precipitates, such as at least 90 or even 95 wt-%. When another method for removing the precipitates from the heat treated feedstock (e.g. step ii of the method) is used, the efficiency of the removal is preferably within the same range as for filtering by pre-processing.

In one embodiment, the solid precipitate formed in step ii is retained into the heated pre-processing zone.

The suitably impurity adjusted renewable feedstock of step i may further be heated up before it enters the subsequent pre-processing zone or reactor, i.e. the precipitate retaining layer of the preprocessing, or the main active catalyst bed of the hydrotreatment. The temperature of the feedstock may be elevated using a heat exchanger upstream of the pre-processing zone. The heated feedstock is then directed to the preprocessing zone wherein the precipitation takes place and the precipitate is retained in the layer therein allowing the purified liquid renewable feedstock to enter the hydrotreatment zone or reactor. Thus, in one embodiment, the impurity adjusted renewable feedstock is subjected to a temperature from 190 to 400° C. by directing it through a heat exchanger.

It has further been found that the presence of hydrogen gas is beneficial for precipitation. In one embodiment, the impurity adjusted renewable feedstock is entered into the pre-processing or hydrotreatment in the presence of hydrogen gas. Hydrogen may be directed to the pre-processing zone/reactor or hydrotreatment zone/reactor together with the feedstock or separately. The hydrogen pressure may be from 1 to 12 MPa and the hydrogen flow in the range from 100 to 1500 Nl $H_2$/l feed.

In a hydrotreatment processing unit, such as a hydrodeoxygenation reactor, a catalyst is used for the removal of oxygen from the feedstock resulting in an effluent exiting the reactor. The conversion performance of the catalyst is a function of time. Eventually, the performance of a catalyst deteriorates to a level where the catalyst needs to be changed which is a costly and elaborate maintenance task, wherein the less time is used for the catalyst change, the smaller will be the production loss. The useful time of the catalyst is depicted by the catalyst cycle length i.e. catalyst life cycle length for the processing unit. In a hydrodeoxygenation unit the cycle length is defined by estimating the time the unit can run with full capacity without hydrodeoxygenation conversion decreasing below the critical level, which is based on a predefined criteria set for hydrodeoxygenation conversion without reducing unit capacity.

In the production of renewable fuels, the ability to use low quality feeds, such as waste and residue feedstock abundant in impurities, gives the possibility of sourcing a wider range of raw materials. Problematic impurity elements in waste and residue feedstocks are particularly phosphorus and metals, among impurities like chlorides and nitrogen. Especially phosphorus and metals tend to accumulate on the catalysts and deactivate them, leading to shorter catalyst life cycle lengths.

When describing the embodiments of the present invention, the combinations and permutations of all possible embodiments have not been explicitly described. Nevertheless, the mere fact that certain measures are recited in mutually different dependent claims or described in different embodiments does not indicate that a combination of these measures cannot be used to advantage. The present invention envisages all possible combinations and permutations of the described embodiments.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Furthermore, the described features, structures, or characteristics may be combined in any suitable manner in one or more embodiments. In the description, numerous specific details are provided to provide a thorough understanding of embodiments of the invention.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

The terms "comprising", "comprise" and comprises herein are intended by the inventors to be optionally substitutable with the terms "consisting of", "consist of" and "consists of", respectively, in every instance.

EXAMPLES

Example 1

A crude feedstock containing used cooking oil (UCO) and animal fat (AF) was used for the hydrodeoxygenation (HDO) experiments. The crude feedstock was purified by pre-treatment using bleaching which resulted in a pretreated feedstock having a phosphorus amount within the range from 0.1-7.0 ppm measured as elemental phosphorus and 0.1-0.5 ppm of each metal, wherein the most abundant metals were used herein, namely Fe, K, Ca, Na, and Mg, measured as elemental metals. The amount of phosphorus and metals of the pretreated feedstock were analysed by first digesting a sample of the feedstock with acids in a microwave oven to obtain a visually clear water/acid matrix, then diluting it to a known amount and analysing it against the acid based calibration using ICP-MS/MS (tandem Inductively Coupled Plasma-Mass Spectrometry).

The pretreated feedstock was directed to an HDO reactor. The HDO reactor contained inside a grading layer upstream of the HDO zone and the main active catalyst bed therein. The grading layer contained essentially alumina with a small amount of low activity NiMo catalyst, and the thickness of the grading layer was ¼ of the thickness of the HDO catalyst layer. The reactor temperature at the grading layer inlet was about 270° C., the pressure 5 MPa, WHSV 0.75 h$^{-1}$, and the pretreated feedstock was directed to the grading layer together with hydrogen gas, 900 Nl H$_2$/l feed.

From the grading, the feedstock was directed to a hydrodeoxygenation zone containing the main active HDO catalyst bed. The HDO catalyst material in this bed was sulphided NiMo on an alumina support. The HDO zone inlet temperature was 320° C. and the pressure was 5 MPa, WHSV was 3 h$^{-1}$, and the feedstock was directed to the catalyst together with hydrogen gas, wherein the hydrogen to feedstock ratio was 900 Nl H$_2$/l feed.

The reactor was operated upto a predetermined point (fulfilling the criteria for the end of HDO catalyst life cycle) wherein the catalyst change was necessary due to deactivation of the HDO catalyst, whereby the catalyst material was changed to a fresh one. Most of the loose dust formed at the grading layer entry was retained into the grading layer, about 80-90%, and the rest was carried over to the HDO catalyst. The dust formed was collected and analysed by X-ray diffraction (XRD) as depicted in FIG. 1, and the total amount of accumulated phosphorus was determined quantitatively using ICP-MS/MS.

FIG. 1 shows that the dust from the reactor contains calcium iron phosphate (a) and sodium iron phosphate (b).

Six HDO catalyst life cycle experiments were made as described above, determining the phosphorus and metals contents (and M:P ratios) in the pretreated feedstock directed to the HDO processing, as well as the amount of the dust generated. The metal to phosphorus ratios of the feed M:P (kg of metal calculated as elementary metal, per kg of phosphorus calculated as elementary phosphorus) for the six catalyst life cycle experiments are shown in Table 1.

TABLE 1

| Feed M:P (kg/kg) | Impurity dust/main active HDO catalyst (kg/kg) |
|---|---|
| 0.57 | 0.25% |
| 0.63 | 0.47% |
| 0.78 | 0.51% |
| 0.81 | 0.87% |
| 1.04 | 1.09% |
| 1.14 | 0.73% |

Figure 2:
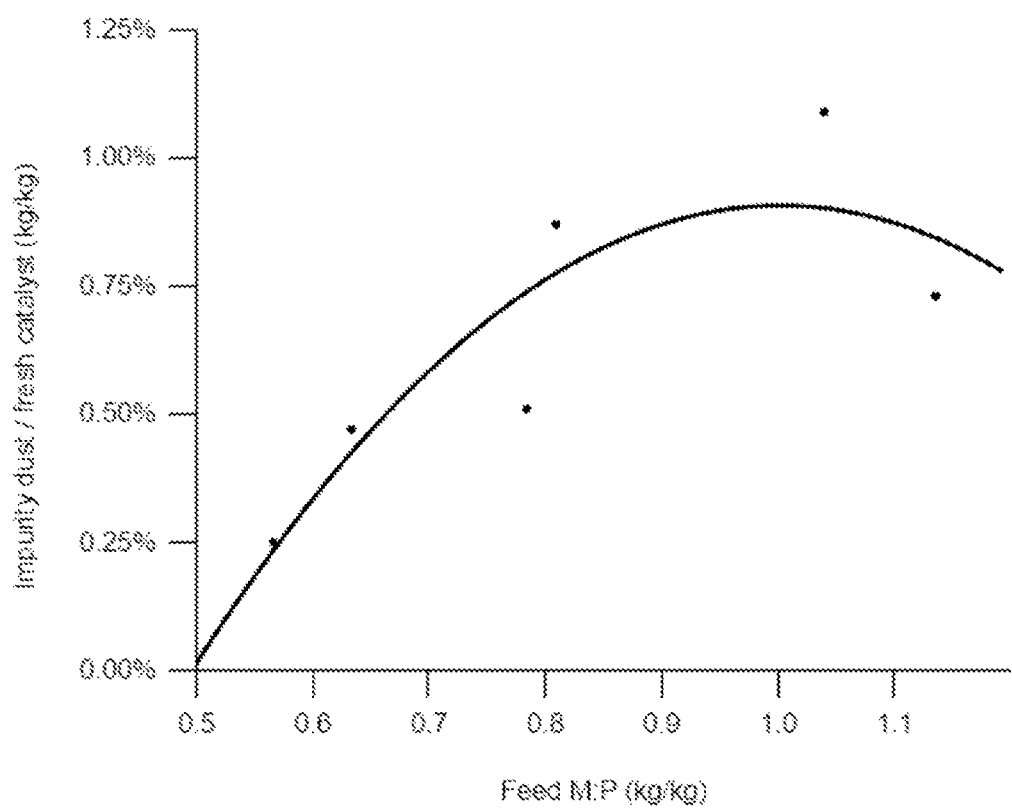
FIG. 2 shows the correlation of impurity dust per the main active HDO catalyst weight ratio to metal (M) to phosphorus (P) weight ratio in the feed.

FIG. 2 depicts the amount of metal phosphate dust ("impurity dust") in kg filtered into the gradings and main active HDO catalyst as a function of metal to phosphorus ratio (in kg of total metals/kg of elemental phosphorus). The amount of "impurity dust" is normalized to the amount of main active HDO catalyst (kg). The dust in FIG. 2 refers to the precipitated impurities, mostly metal phosphates, entrained into the layers after operating the hydrotreatment reactor with the different renewable feeds. The weight of main active HDO catalyst is that which was initially loaded inside the reactor. The M:P ratio was calculated with the total amounts of impurities fed to the reactor during operation.

Figure 3:
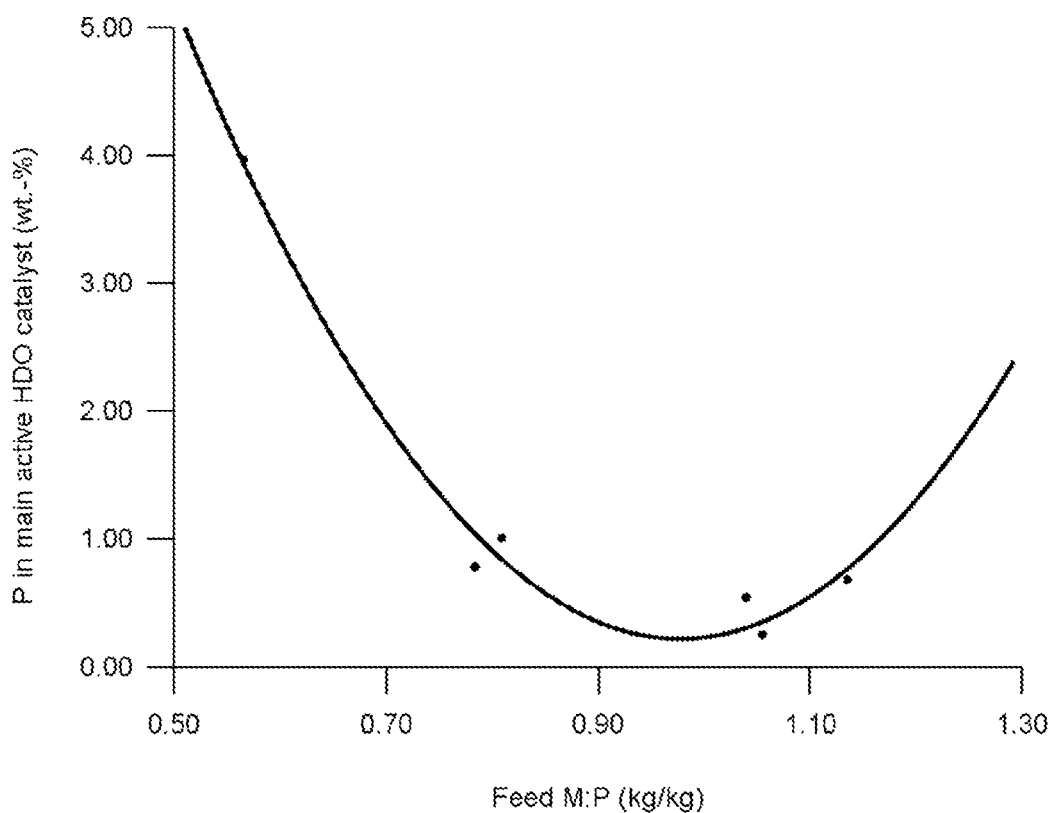
FIG. 3 shows the correlation of the amount of phosphorus (P) found in the spent main active catalyst (in weight-%) to the metal to phosphorus ratio (M:P, weight based) in the feed.

The experiments performed in the hydrodeoxygenation reactor showed that the metal to phosphorus weight ratio in the feedstock needed to be within the range of about 0.70-1.26 (see FIG. 3) whereby only a low level of about 2.0 wt-% or less of phosphorus remained in the catalyst bed after the production cycle. A lower metal amount causes accumulation of phosphorus into the spent HDO catalyst material whereas a higher amount similarly starts to increase the amount of phosphorus in the spent HDO catalyst. FIG. 3 and Table 2 show the increasing behaviour of phosphorus accumulation into the HDO catalyst bed (in wt-%) when the metals to phosphorus weight ratio of the feedstock is deviating from the minimum value around one.

TABLE 2

| Feed M:P (kg/kg) | P in main active HDO catalyst (wt-%) |
|---|---|
| 0.57 | 3.97 |
| 0.78 | 0.78 |
| 0.81 | 1.00 |
| 1.04 | 0.54 |
| 1.06 | 0.25 |
| 1.14 | 0.68 |

The key factor identified as contributing to the formation of phosphate-rich impurity precipitates was the metal to phosphorus (M:P) weight ratio in the feedstock, which positively correlated with the amount of impurity dust formed during the operation of a hydrodeoxygenation reactor with different feedstocks having different M:P ratios. The feeds with the M:P ratios around one were found to form more of the impurity dust than the feeds with lower or higher M:P ratios. Furthermore, the amount of phosphorus attached to the catalyst after the same operation was negatively correlated with the feed M:P ratio. The obtained results show that a suitable selected M:P weight ratio can contribute to prevent catalyst fouling by phosphorus and thereby lengthen the lifetime of the catalyst.

The advantage of adjusting the M:P weight ratio and thereby minimising the amount of P in the main active HDO catalyst is that the activity of the catalyst can be preserved for a longer time, allowing for a higher total throughput in a production cycle. For example, it was observed that in a production cycle with a feed M:P weight ratio of 0.63, the cumulative feedstock that could be processed was 9436 kg per kg of active HDO catalyst. In another production cycle, where the feed M:P weight ratio was 0.81, the cumulative feedstock processed was increased by 60% compared to the aforementioned cycle, to 15223 kg per kg of active HDO catalyst. Therefore, the higher throughput obtained when the feed M:P weight ratio was within the advantageous range is an indication that the catalyst was deactivated to a lesser extent, allowing to operate with a higher feed rate for a longer period of time.

Example 2

Brown grease based feedstock (1) and dry rendered poultry fat based feedstock (2) were pretreated by degumming and bleaching. The brown grease based feedstock having a phosphorus content of 0.3 ppm and a metal (sum of Na, Mg, K, Ca and Fe) content of 1.3 ppm was mixed with the dry rendered poultry fat based feedstock having a high phosphorus content of 13.5 ppm and a metal (sum of Na, Mg, K, Ca and Fe) content of 1.3 ppm. The weight based mixing ratio feedstock (1):feedstock (2) was 2:1. The mixed feedstock resulted in a M:P ratio of about 0.96.

The mixed feedstock was directed to a fixed bed HDO reactor containing inside a grading layer upstream of the main catalyst bed according to Example 1, containing essentially alumina with a small amount of low activity NiMo catalyst.

The reactor was operated according to a predetermined criteria for a catalyst change. The catalyst change was necessary due to deactivation after a time period which was slightly longer (about 5%) than in example 1 for the experiments having the M:P ratios within the range 0.76 to 1.20.

It was not possible to operate the reactor properly using the feedstocks (1) and (2) separately, due to a rapid degradation of the catalyst performance which was assigned to the too high amount of metals or phosphorus, depending on the feedstock.

It is concluded that it is possible to reach good results even with unsuitable feeds provided that they are adjusted to a metal to phosphorus ratio near one, for example by appropriately mixing the feeds together and heat treating them in the presence of hydrogen and a material capable of at least partially hydrotreating to enable precipitate formation.

The invention claimed is:

1. A method for reducing deactivation of a hydrotreatment catalyst, wherein the hydrotreatment catalyst is used as a main active catalyst for producing renewable hydrocarbons by hydrotreatment from a renewable feedstock comprising at least an oxygen containing compound, at least one metal containing compound and at least one phosphorus containing compound as impurities, the renewable feedstock having a metal to phosphorous (M:P) weight ratio, said method comprising:
   i. adjusting the M:P weight ratio of the renewable feedstock to a value within the range from 0.70 to 1.26, measured as elemental metal and elemental phosphorus, to obtain an impurity adjusted renewable feedstock, and
   ii. subjecting the impurity adjusted renewable feedstock to a temperature from 190 to 400° C. under reducing conditions, thereby forming a solid precipitate comprising at least one metal and phosphorus containing compound, and a purified liquid renewable feedstock, and
   iii. contacting the purified liquid renewable feedstock with a main active catalyst, in the presence of hydrogen.

2. The method of claim 1, wherein adjusting the M:P weight ratio comprises blending the renewable feedstock with a second renewable feedstock having a balancing amount of one of a metal containing compound and a phosphorus containing compound, the balancing amount sufficient to achieve an M:P weight ratio from 0.70 to 1.26 for the impurity adjusted renewable feedstock after blending the renewable feedstock and the second renewable feedstock.

3. The method of claim 2, wherein the balancing amount of one of a metal containing compound and a phosphorus containing compound is determined by:
   determining the amount of metal (M1) and phosphorus (P1) in weight-% in the renewable feedstock,
   determining the amount of metal (M2) and phosphorus (P2), in weight-% in the second renewable feedstock, and
   selecting the second renewable feedstock and an amount thereof sufficient to result in the impurity adjusted renewable feedstock having an M:P weight ratio of total metal (M1+M2) amount to the total phosphorus (P1+P2) amount of from 0.70 to 1.26.

4. The method of claim 1, wherein adjusting the M:P weight ratio comprises adding an amount of at least one metal containing compound to the renewable feedstock sufficient to achieve a M:P weight ratio of from 0.70 to 1.26 for the impurity adjusted renewable feedstock.

5. The method of claim 4, wherein the at least one metal containing compound is an ionic metal containing compound.

6. The method of claim 4, wherein the at least one metal containing compound is at least one of a hydroxide and a fatty acid salt.

7. The method of claim 2, wherein the required amount of the at least one metal containing compound to be added is determined by:
   determining the amount of metal (M1) and phosphorus (P1) in weight-% for the renewable feedstock, and
   calculating as elemental metal the required amount of metal containing compound (M2') to be added to result in the impurity adjusted renewable feedstock having an M:P weight ratio of total metal (M1+M2') to phosphorus of from 0.70 to 1.26.

8. The method of claim 1, wherein adjusting the M:P weight ratio comprises reducing the amount of one of the phosphorus containing compound and the metal containing compound by pre-treatment of the renewable feedstock to a level such that the impurity adjusted renewable feedstock has an M:P weight ratio of from 0.70 to 1.26.

9. The method of claim 8, wherein the pre-treatment comprises one of bleaching, degumming, or both bleaching and degumming.

10. The method of claim 1, wherein adjusting the M:P weight ratio comprises one or more of:
   blending the renewable feedstock with a second renewable feedstock comprising a compensating amount of one or a metal containing compound and a phosphorus containing compound,
   adding a metal containing compound to the renewable feedstock,
   reducing the amount of one of the phosphorus containing compound and the metal containing compound by pre-treatment.

11. The method of claim 1, wherein the renewable feedstock is subjected to pre-treatment before or after adjusting the M:P weight ratio.

12. The method of claim 1, wherein the amount of metal containing compounds and phosphorus containing compounds in the purified liquid renewable feedstock are reduced into a value less than 20 ppm of metals calculated as elemental metal and less than 20 ppm of phosphorus calculated as elemental phosphorus, measured by ICP-AES.

13. The method of claim 10, wherein the pre-treatment comprises at least one of filtration, settling, centrifugation, water washing, degumming, bleaching, and combinations thereof.

14. The method of claim 1, wherein the renewable feedstock contains at least one of triglycerides and free fatty acids.

15. The method of claim 14, wherein the at least one of triglycerides and free fatty acids originate from feedstock comprising at least one of acidulated soapstock, poultry fat, dry rendered poultry fat, brown grease, used cooking oil, tall oil, fraction of tall oil, crude tall oil, tall oil pitch, palm oil mill effluent, crude palm oil, palm oil, palm seed oil, palm fatty acid distillate, babassu oil, carinata oil, coconut butter, muscat butter oil, sesame oil, maize oil, poppy seed oil, cottonseed oil, soy oil, laurel seed oil, jatropha oil, palm kernel oil, camelina oil, archaeal oil, bacterial oil, fungal oil, protozoal oil, algal oil, seaweed oil, mustard seed oil, oils from halophiles, soybean oil, technical corn oil, rapeseed oil, colza oil, canola oil, sunflower oil, hempseed oil, olive oil, linseed oil, mustard oil, peanut oil, castor oil, coconut oil, lard, tallow, train oil, spent bleaching earth oil, lignocellulosic based feeds, and mixtures thereof.

16. The method of claim 1, wherein the hydrotreatment comprises one of hydrodeoxygenation; combined hydrodeoxygenation and isomerisation; or sequential hydrodeoxygenation and isomerisation.

17. The method of claim 1, wherein the main active catalyst comprises a catalyst suitable for one of hydrodeoxygenation and combined hydrodeoxygenation and hydroisomerisation.

18. The method of claim 16, wherein the hydrodeoxygenation is performed in a hydrodeoxygenation reactor or zone, in the presence of at least the main active catalyst, comprising a metal on a support.

19. The method of claim 18, wherein the metal comprises at least one of Pd, Pt, Ni, Co, Mo, Ru, Rh, W, and a combination thereof, and the support comprises at least one of alumina, silica, zirconia, zeolite, and mixtures thereof.

20. The method of claim 16, wherein the hydrotreatment further comprises directing the impurity adjusted renewable feedstock through a heated pre-processing zone upstream of the main active catalyst.

21. The method of claim 20, wherein the heated pre-processing zone comprises a compound having less activity for hydrodeoxygenation than the main active catalyst.

22. The method of claim 20, wherein the heated pre-processing zone comprises a compound having no activity for hydrodeoxygenation.

23. The method of claim 20, wherein the solid precipitate formed in step ii is retained in the heated pre-processing zone.

24. The method of claim 1, wherein the temperature in step ii is from 240° C. to 380° C.

25. The method of claim 24, wherein the temperature in step ii is from 250° C. to 370° C.

26. The method of claim 25, wherein the temperature in step ii is from 260° C. to 360° C.

27. The method of claim 1, wherein the M:P weight ratio of the renewable feedstock is adjusted to a value within the range from 0.73 to 1.25, measured as elemental metal and elemental phosphorus, to obtain an impurity adjusted renewable feedstock.

28. The method of claim 1, wherein the reducing conditions comprise the presence of hydrogen or water.

29. The method of claim 1, wherein the renewable feedstock comprises at least one feedstock material.

30. The method of claim 2, wherein at least one of the renewable feedstock and the second renewable feedstock comprises at least one feedstock material.

31. The method of claim 1, wherein the method is one of a batch process and a continuous process.

* * * * *